United States Patent [19]

Gray

[11] 3,970,603

[45] July 20, 1976

[54] AMINO ACID DERIVATIVES OF CHLOROMETHYLATED POLYMERS AND METHODS OF MAKING THE SAME

[75] Inventor: Don N. Gray, Sylvania, Ohio

[73] Assignee: Owens-Illinois, Inc., Toledo, Ohio

[22] Filed: Oct. 15, 1974

[21] Appl. No.: 512,760

Related U.S. Application Data

[62] Division of Ser. No. 363,377, May 24, 1973, abandoned.

[52] U.S. Cl. ............................... 526/12; 260/2.1 E; 260/2.2 R; 260/78 A; 260/78.41; 526/13; 526/46; 526/49; 526/50; 526/339
[51] Int. Cl.$^2$ ........................................ C08F 222/08
[58] Field of Search ............ 260/2.1 E, 2.2 R, 78 A, 260/88.2 S, 78.5 HC, 78.4 D

[56] References Cited

FOREIGN PATENTS OR APPLICATIONS 767,821   2/1957   United Kingdom .............. 260/2.1 E

OTHER PUBLICATIONS

Flory—Principles of Polymer Chemistry, 1953, pp. 75–78, 102–103.

Journal of the American Chemical Society, vol. 67, (1945), pp. 502–503.

*Primary Examiner*—Harold D. Anderson
*Attorney, Agent, or Firm*—Richard D. Heberling; E. J. Holler

[57] ABSTRACT

The application discloses polymers and methods of making same in which a chlorine atom of a chloromethyl pendant group of a polymer such as a chloromethylated copolymer of styrene and divinylbenzene is substituted with a derivative of malonic acid having a protected amino group on the alpha-carbon atom and two carboxyl groups or precursors thereof to form, via several steps, the alpha-amino acid derivative of the starting polymer. These polymers are used, for instance, as ion exchange resins, as substrates for affinity chromotography, and as a starting resin for solid peptide synthesis. The resultant polymer is also used as a starting material to make a polymer with a pendant group that is a derivative of oxazolidone-2,5-dione, substituted at the 4-position. These polymers are used, for example, as the matrix for solid phase peptide synthesis and as the starting resin for solid phase peptide degradation.

9 Claims, No Drawings

AMINO ACID DERIVATIVES OF CHLOROMETHYLATED POLYMERS AND METHODS OF MAKING THE SAME

This is a division of application Ser. No. 363,377 filed May 24, 1973, now abandoned.

The present invention relates to a polymer and a method of making the same in which a chlorine atom of a chloromethyl pendant group of a polymer is removed by reaction with a derivative of malonic acid having a protected amino group on the alpha carbon atom and two carboxyl groups, or precursors thereof, to form the alpha-amino acid derivative of the starting polymer.

The present invention also relates to polymers made from the above described alpha-amino acid derivative and methods of making same in which the polymer is provided with a pendant group that is a derivative of oxazolidone-2,5-dione substituted in the 4-position.

The present invention, in particular, relates to a copolymer of styrene and divinylbenzene that has an alpha-amino acid group as a pendant group, the pendant group being formed by the reaction of a chlorine atom of a chloromethylated group with a derivative of malonic acid having a protected amino group on the alpha carbon atom and two carboxyl groups or precursors thereof. This alpha-amino acid derivative of the chloromethylated copolymer is further reacted to provide a copolymer having a pendant group that is a derivative of oxazolidone-2,5-dione substituted at the 4-position.

Solid phase peptide synthesis and solid phase peptide degradation are important areas of medicinal, agricultural, biochemical and industrial research. A starting resin for solid phase peptide degradation and an insolubilized matrix for solid phase peptide synthesis are particularly useful and desirable.

It is an object of the present invention to provide a polymer and a method of making the same, the polymer being an outstanding starting resin for solid phase peptide degradation and as an insolubilized matrix for solid phase peptide synthesis, a chlorine atom of a chloromethyl pendant group of the polymer such as a chloromethylated copolymer of styrene and divinylbenzene being removed with a derivative of malonic acid having a protected amino group on the alpha carbon and two carboxyl groups or precursors thereof to form the alpha-amino acid derivative of the starting polymer.

It is an object of the present invention to provide polymer suitable for starting resins for solid phase peptide degradation and insolubilized matrix for solid phase peptide synthesis and methods of making the same in which alpha-amino acid derivatives of starting chloromethylated polymer such as a chloromethylated copolymer of styrene and divinylbenzene are used to make a polymer with a pendant group that is a derivative of oxazolidone-2,5-dione substituted at the 4-position.

It is an object of the present invention to provide a copolymer of styrene and divinylbenzene, the polymer containing a plurality of pendant groups that are alpha-amino derivatives of the starting copolymer by reaction of a chlorine atom of each of the chloromethyl pendant groups, so substituted, with a derivative of malonic acid having a protected amino group on the alpha carbon atom and two carboxyl groups or precursors thereof.

It is an object of the present invention to provide a cross-linked polystyrene that is a copolymer of styrene and divinylbenzene, the polymer having a plurality of pendant groups in which each group is a derivative of oxazolidone-2,5-dione substituted at the 4-position.

It is an object of the present invention to provide a polymer suitable for use as a polymeric base for ion exchange resin and a chelating ion exchange, and as an insolubilized matrix for solid phase peptide synthesis in which a chloromethylated copolymer of styrene and about 1-8% by weight of divinylbenzene is reacted with a derivative of malonic acid having a protected amino group on the alpha carbon atom and two carboxyl groups or precursors thereof to form an intermediate polymer that is an alpha-amino acid derivative.

It is an object of the present invention to provide a polymer suitable for solid phase peptide degradation and for solid phase peptide synthesis in which the above-described intermediate polymer is reacted to provide a plurality of pendant groups in which each group is a derivative of oxazolidone-2,5-dione substituted at the 4-position.

It is an object of the present invention to provide a method of making a cross-linked polystyrene containing recurring units in the molecular chain as follows:

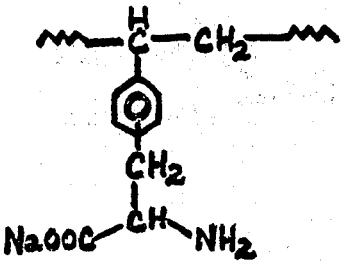

the method comprising the steps of:
1. reacting a chloromethylated copolymer of styrene and divinylbenzene with ethyl-acetamido-cyanoacetate to form ethyl-alpha-acetamido-alpha-cyano-beta-polystyrene propionate; and
2. reacting the product of step 1 with HBr and $Na_2CO_3$ to form a polymer containing recurring units as above-described in the molecular chain.

The present invention also provides the outstanding method of making a cross-linked polystyrene with certain derivatives of a dione group dangling from the main chain, the method comprising the steps of:

1. reacting a chloromethylated copolymer of styrene and divinylbenzene with a derivative of malonic acid such as ethyl-acetamido-cyanoacetate to form ethyl-alpha-acetamido-alpha-cyano-beta polystyrene propionate;
2. reacting the product of step 1 with HBr and $Na_2CO_3$ to for a cross-linked polystyrene; and
3. reacting the product of step 2 with phosgene to provide a polymeric reaction product having recurring units in the molecular formula as follows:

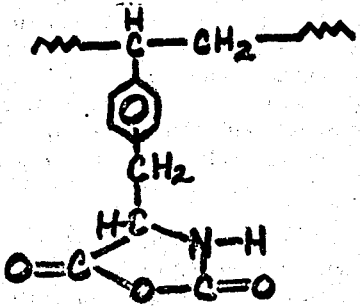

These and other objects will be apparent from the specification that follows and the appended claims.

The present invention solves a problem in providing a novel cross-linked polystyrene containing derivatives of amino-acid groups substituted on the main chain; such novel cross-linked polystyrenes being useful for ion exchange and as intermediates for further preparation of novel cross-linked polystyrenes containing certain phenylalanine groups dangling from the main chain; such groups providing recurring units in the molecular formula as follows:

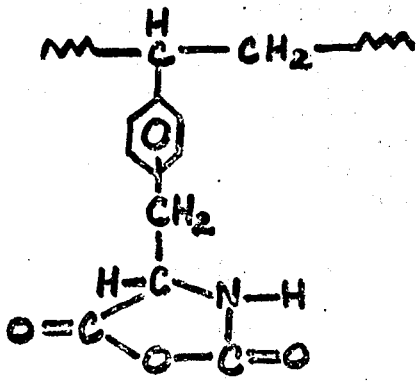

The present invention provides a novel polymer and a method of making the same in which a chlorine atom of a chloromethyl pendant group of a starting polymer such as a copolymer of styrene and divinylbenzene is removed by reaction with a derivative of malonic acid having a protected amino group on the alpha carbon atom and two carboxyl groups or precursors thereof to form an alpha-amino acid derivative of a starting polymer.

The present invention also provides a novel polymer made from the above-described alpha-amino acid derivative and methods of making the polymer in which the polymer is further provided with a pendant group that is a derivative of oxazolidone-2,5-dione substituted in the 4-position.

In a preferred embodiment of the present invention, there is provided a chloromethylated copolymer of styrene and divinylbenzene that contains an alpha-amino acid group as a pendant group, the pendant group being formed by the reaction of a chlorine atom of a chloromethylated group with a derivative of malonic acid having a protected amino group on the alpha carbon atom and two carboxyl groups or precursors thereof. A derivative of malonic acid such as ethyl-acetamino-cyano acetate can be used to form the alpha-amino acid derivative. As previously indicated, the alpha-amino derivative of the chloromethylated copolymer is reacted with phosgene or equivalent to provide the copolymer with a pendant group that is a derivative of oxazolidone-2,5-dione substituted at the 4-position.

Thus, in one of the preferred embodiments of the present invention, there is provided a cross-linked polystyrene, partially substituted with an N-carboxy-alpha-amino acid-anhydride moiety whereby the cross-linked 4-oxazolidone-2,5-dione moiety has recurring units in the chemical formula as follows:

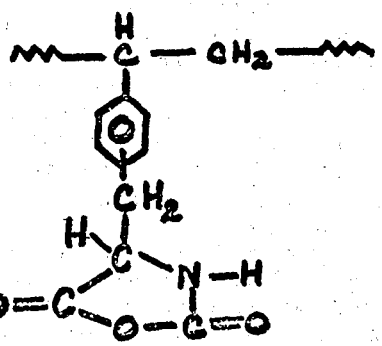

The resultant polymer is useful as a catalyst, an ion exchange resin, and can be used to insolubilize an enzyme as disclosed in U.S. copending application Ser. No. 363,676, filed May 24, 1973, now U.S. Pat. No. 3,860,486, for an invention of Keyes and Semersky; the copending application being filed concurrently herewith and assigned to the same assignee as that of the present application.

In one of the more preferred embodiments of the present invention, a novel polymer is provided starting with a chloromethylated copolymer of styrene and about 2 percent by weight of divinylbenzene, the copolymer generally being composed of a long molecular chain bearing a phenyl ring on about every second carbon atom. This starting copolymer is reacted with a derivative of malonic acid that is preferably ethyl-acetamido-cyano acetate to form an alpha-amino acid derivative of the starting copolymer. The resultant novel polymer is further reacted with a cleavage agent that is preferably hydrobromic acid and also hydrolyzed to obtain the free acid form of the polymer or the acid salt thereof in which the pendant group that dangles from the main chain contains an alpha-amino acid group in addition to the carboxyl or acid salt group. This novel polymer can also be further reacted to provide another novel polymer by reaction with phosgene, to provide the cross-linked copolymer of styrene and divinylbenzene with pendant groups that are derivatives of oxazolidone-2,5-dione substituted in the 4-position.

The present invention also provides novel methods of preparing the previous described novel polymers. In forming the first novel polymer, the outstanding method employed is the removal of a chlorine atom of a chloromethyl pendant group of a starting chloromethylated polymer by reaction with a derivative of malonic acid having a protected amino group on the alpha carbon atom and two carboxyl groups or precursors thereof (such as cyano groups or the acid salt such as a NaOOC— group). After the first reaction with a derivative of the malonic acid, as previously indicated, the alpha-amino acid derivative of the starting polymer is formed. In providing the second novel polymer, there is provided a method involving a hydrolysis and a cleavage to convert any cyano groups, etc. to COOH groups or COOR groups in which R is a metal such as Na, K, or Ca, or an alkyl group of 1 to 6 carbon atoms, and to remove the masked amino group to provide an amino group on the alpha carbon atom.

In providing the third novel polymer of the present invention, the above-described polymer containing the alpha-amino acid pendant groups, the polymer is provided with pendant groups that are derivatives of oxazolidone-2,5-dione substituted at the 4-position by using the Fuchs-Farthing modification of the Leuchs reaction involving the use of phosgene.

The present invention preferably utilizes a chloromethylated copolymer of styrene and divinylbenzene, such as the so-called Merrifield resin. This starting material is one that is well-known in the art and, for instance, is described in the article by Merrifield, J. Am. Chem. Soc., 86, 304(1965); and J. Am. Chem. Soc., 85, 2149(1963). This polymer is generally available commercially and is sold as a chloromethylated polystyrene with divinylbenzene having about 1.2 to 1.9 milliequivalents of chloride per gram of polymer. As is well-known in the art, this polymer is useful in biochemical applications, and the present invention provides such a polymer with certain groups that are highly useful that extend from the main chain.

The preferred chloromethylated Merrifield polymer is one described in *Solid Phase Peptide Synthesis* by Stewart and Young, W. H. Freeman and Co., San Francisco, California, 1969, pages 5 and 6. It is therein described that a preferred polymerization is one prepared by copolymerization of styrene with 2% divinylbenzene, the resultant copolymer being composed of a long alkyl chain bearing a phenyl ring on every second carbon atom. These chains are generally cross-linked at approximately every fortieth to sixtieth carbon and preferably every fiftieth carbon atom by para-diethylphenyl residues derived from the divinylbenzene. A preferred Merrifield polymer is one composed of fine beads — about 20–70 microns in diameter; the cross-linking of the polymer renders it completely insoluble in all ordinary solvents, although a low degree of cross-linking does produce a resin that swells effectively in certain organic solvents; however, even though the degree of cross-linking is low, it is chemically inert during peptide synthesis.

As is well-known, the swelliing in solvents is important, since many of the peptide chains on the resin are attached within the pores and interstices and swelling is generally necessary for satisfactory penetration of the solvents and reagents.

In preparing the novel copolymers of the present invention, the chloromethylated copolymer of styrene and divinylbenzene is well-known in the art as previously indicated. In reacting chloromethylated copolymer of styrene and divinylbenzene with ethylacetamidocyanoacetate to form a chloromethylated copolymer of styrene and divinylbenzene, the preparation of alpha-amino acids from monomeric chloromethyl compounds involving ethylacetamidocyanoacetate, is shown, for instance, in the article by Albertson, J. Am. Chem. Soc. 67, 502 (1945); 68, 450 (1946).

It can be seen that the first step in the method of the present invention involves the preparation of an alpha-amino acid group extending from the main chain. The alpha-amino acid, or precursor thereof, preferably has a masked amino group and a cyano group and an alkyl ester group, both of the latter groups being hydrolyzable to a —COOH group.

It can be seen that the second step of the method of the present invention involves a hydrolysis and a cleavage of the precursor of the alpha-amino acid by the use of a cleavage reagent, namely 48% hydrobromic acid. Hence, there is a cleavage in addition to the hydrolysis as above described by the Albertson article. The free acid form of the polymer can be obtained in which there is an alpha-amino acid group extending from the main chain, using the method of Matsumoto (Chem. and Pharm. Bulletin, Japan), 15, 1990–1995 (1967), to provide a cleavage/decarboxylation step.

After obtaining the above polymer from the cleavage/decarboxylation step, it can be seen that the third step is the conversion of the product to a polymer containing the N-carboxy-alpha-amino acid anhydride using the well-known Fuchs-Farthing modification (Jour. Chem. Soc., 1950, 3213) of the Leuchs reaction Chem. Ber., 39,857, (1906). This thrid step involves the use of phosgene, the chlorine atoms of the phosgene reacting with one hydrogen atom of the amino group and reacting with the hydrogen atom or a sodium atom of the carboxyl group to form as by-products, HCl and NaCl. The resulting polymer then has recurring units in the main chain as illustrated:

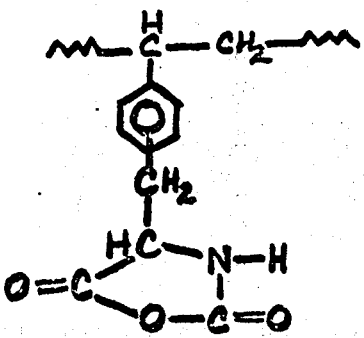

It can be seen that in the above recurring unit the group dangling from the cross-linked polystyrene is one partially substituted by the 4-oxazolidone-2,5-dione moiety, the moiety being named as a derivative of oxazolidone-2,5-dione substituted at the 4-position.

In the present invention, in a broad aspect, the starting material is a polymer having —CH$_2$X groups dangling from its main chain, the "X" groups being chlorine or bromine which provide an effective site for further reaction to, for instance, provide an alpha-amino acid on the group that extends from the chain.

As previously indicated, the chlorine or bromine atom of the above-described —CH$_2$X group is removed by reaction with a derivative of malonic acid having a protected amino group on the alpha-carbon atom and having two —COOH groups or precursors thereof (including —COOC$_2$H$_5$ and —CN) whreby an intermediate product is formed.

There are two methods of forming the alpha-amino acid derivative of malonic acid being hydrolyzed and decarboxylated to form the free amino acid or the acid salt of the alpha-amino acid. One method involves the use of 48% HBr at the boiling point. To form the free phenylalanine, the pH is adjusted to about 6.5, which is the iso-electric point of monomeric phenylalanine. The two-step methodof Albertson can be used, which involves alkalizing with a strong base to effect hydrolysis, and thereafter acidifying with a strong acid to effect decarboxylation. If the free acid is desired, the reaction mixture can be neutralized to a pH of 6.5, which is the iso-electric point of monomeric phenylalanine.

The following examples are intended to illustrate the invention and not to limit the same in any way.

EXAMPLE I

A chloromethylated copolymer of styrene and divinylbenzene was reacted with ethyl-acetamidocyanoacetate in an amount of 10 grams of the copolymer to 0.5 grams of the acetate along with anhydrous potassium carbonate (0.4 grams), sodium iodide (0.02 grams) and anhydrous ethanol (0.5 ml) in a 250 ml, 3-neck flask. The resultant mixture was slurried and heated under reflux with stirring for a period of about 19–20 hours. The second, third and fourth named ingredients above were in excess of about five times the amount required to react with the chloromethyl groups based on the amount of chlorine in the copolymer which was about 1.9 meq. Cl/g of copolymer. The resultant reaction mixture was filtered and beige-colored solids remained on the filter. The filter was a clear, dark amber color. The solid reaction product was washed in a 100 ml beaker with 75 ml of fresh ethanol. The washed solids were heated to nearly the boiling point with stirring and then the solids once again filtered while hot. The washing step was again repeated to remove any unreacted ethyl-acetamidocyanoacetate. The filtrate (ethanolic) was checked to determine if there was any unreacted chloromethylated copolymer of styrene and divinylbenzene. After two hot alcoholic extractions, no unreacted chloromethylated copolymer of styrene and divinylbenzene was found.

The resultant reaction product, polymer solids, were then extracted in the same manner as previously described, with distilled water. Each of the aqueous extracts was checked with a silver nitrate solution until the presence of precipitated anions — $CO_3$, Cl and I — was found only in negligible amounts. The polymer solids are the copolymer of styrene and divinylbenzene having the precursor groups of alpha-amino acid pendant from the main chain.

In general, the amount of the derivative of malonic acid used is at least one equivalent weight and preferably 3 to 5 or 6 equivalent weights based on the chlorine content of the chloromethylated copolymer, which is preferably about 1.2 to 1.9 milliequivalents of chlorine per gram of copolymer.

EXAMPLE II

The reaction product of Example 1 in the form of a wet polymer filter cake was refluxed for 20 hours at 125°C. with 50 ml of 48% hydrobromic acid. The slurry containing the resultant reaction product was acidic and was filtered. The filtered residue again as washed repeatedly with distilled water until the aqueous filtrate from the washings were negative with silver nitrate indicating no or only negligible amounts of precipitated anions, $CO_3^=$, Cl— and I—. The resultant polymer residue was then slurried with the saturated solution of sodium carbonate. Again the slurry was filtered and the filter residue was repeatedly washed with distilled water until negative to the silver nitrate solution. The polymer residue was placed in a vacuum under full water aspirator pressure at 50°C., and held overnight to provide a dried polymeric reaction product. The resultant reaction product is the copolymer having alpha-amino acid groups pending from the main chain.

EXAMPLE III

The dried polymer reaction product of Example II was introduced in an amount of 9 grams into the three-neck reflux flask previously described. The flask was fitted with a gas inlet tube for the addition of phosgene gas below the liquid surface of the slurry inside the flask. Dioxane (dried with $LiAlH_4$) in an amount of 100 ml was added and the resultant slurry heated to 40°C. where the temperature was held with a temperature controller. Phosgene was added to the slurry over a period of 8 hours at a rate of about 2 bubbles per second. At the end of the 8-hour period, the atmosphere of the slurry was purged at 40°C. with nitrogen gas to remove any residual phosgene. The slurry was filtered under a blanket of dry nitrogen under full water aspirator pressure. The resultant dried filtered solids were transferred to pre-dried (110°C.) vials using a glove bag under a dry nitrogen atmosphere.

The dried solid material of Example III was a copolymer of styrene and the aforementioned oxazolidone derivative having recurring units in the molecular formula corresponding to the previously described formula:

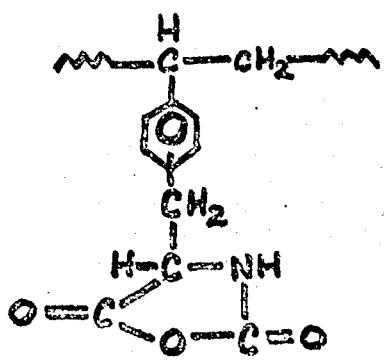

This formula was used as an intermediate product in preparing insolubilized enzymes, and as a base for peptide sequencing.

The amount of phosgene used is generally at least about one equivalent weight and preferably 2 or 3 up to 5 or 6 equivalent weights to react with the amino acid derivative to obtain the oxazolidone derivative.

The product of Example II was determined to be a copolymer of styrene, divinylbenzene, and 4-vinyl phenyl alanine, having recurring groups in the molecular formula according to the previously described formula:

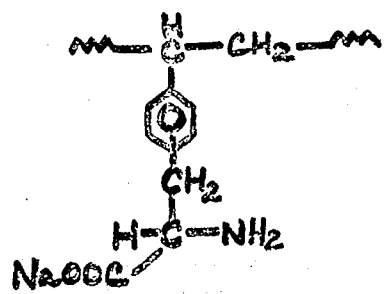

The product of Example II was a friable, insoluble powder. The product, being cross-linked by the use of more than about ½ percent by weight of divinylbenzene, has an extremely high molecular weight and low insolubility, as do cross-linked materials. The powder is a generally white to light tan color with predominant pale yellow color. This material was used as an ion exchange resin and, of course, was used as an intermediate material to produce the product of Example III.

The product of Example III was, of course, also highly cross-linked and was an insoluble, friable powder. This product, as in the case of Example II, can be prepared in the form of micro beads. The product of Example III was generally a predominant pale yellow color, with the color generally ranging from about white to light tan.

The polymer having recurring units in its molecular formula, according to the following formula:

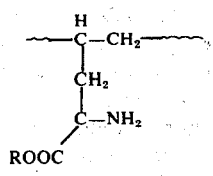

where R is H or a metal such as an alkali metal including Na, K, Li, Rb and Cs or an alkaline earth metal such as Ca, Mg or Sr or an alkyl radical of 1 to 6 carbon atoms, is useful as a polymeric base for ion exchange resins, a chelating ion exchange resin; a substrate for affinity chromotography, a starting resin for a solid phase peptide degradation, and an insolubilized matrix for solid phase peptide synthesis.

The polymer having recurring units in its molecular chain according to the following formula:

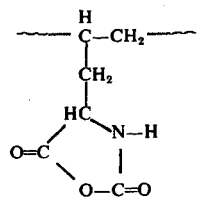

is useful as a starting resin for solid phase peptide degradation, as an insolubilized matrix for solid phase peptide synthesis, and as a base for insolubilizing enzymes.

In the working examples, other chloromethylated polymers previously described as being useful, can be substituted in whole or part for the particular chloromethylated copolymer of styrene and divinylbenzene used in the examples to provide substantially equivalent results. For example, other chloromethylated copolymers of styrene and divinylbenzene can advantageously be used in the present invention. As is wellknown, cross-linking the polystyrene with a cross-linking agent such as divinylbenzene in an amount of up to about 4% by weight of divinylbenzene, results in a polymer that swells in certain solvents, the degree of swelling in the same solvent system being dependent upon the degree of cross-linking and hence upon the amount of divinylbenzene used. Generally, from about 4–6% by weight of divinylbenzene produces a cross-linked polymer that does not swell appreciably and generally above about 6% by weight of divinylbenzene or other equivalent cross-linking agent, there is essentially no swelling.

Chloromethylated polymers with greater than about 6% by weight divinylbenzene can be prepared in a macroporous or macroreticular form. Thus, the matrix of the polymer is porous without the insertion of a solvent molecule to produce porosity, i.e., gelling is not required. The consequence of the porosity is that in polymers having more than 6% of divinylbenzene, the reaction is not diffusion controlled.

Macroporous resins are commercially available from wellknown sources, such as Rohm & Haas and Dow Chemical Company. These macroporous resins are made by suspension polymerization or so-called pearl polymerizations. The monomer, i.e., styrene, the crosslinker (i.e., divinylbenzene) and an inert liquid having solubility for both monomer and the cross-linker, are suspended as droplets in an aqueous medium and polymerized. The result is a rigid bead having the inert solvent in its matrix. The inert solvent is then removed by vacuum, extraction or heat leaving the holes or pores.

Suitable chloromethylated polymers include chloromethylated copolymers of styrene and maleic anhydride. Other chloromethylated polymers include esterified, styrenated, maleic anhydride copolymers, the ester group being either monofunctional (ethyl, propyl, butyl) or a difunctional (ethylene glycol, dyhydroxy polyesters, including the series known as Carbitols, a trademark of Union Carbide Corporation for mono- and di-alkyl ethers of diethylene glycol and their derivatives, those prepared from ethylene oxide, propylene oxide or copolymers).

Other suitable chloromethylated polymers can be prepared from copolymers of styrene with another copolymerizable monomer that is preferably a vinyl monomer such as vinyl acetate, vinyl toluene and ethylene.

In addition, graft copolymers, as for example, styrene grafted on an insoluble matrix, i.e., styrene grafted onto chlorofluorocarbon polymers or styrene grafted to other insoluble matrixes such as acrylonitrile, can be used. In addition, the benzyl chloride moiety can be attached to porous glass as for example by using the compound para-chloromethyl phenyl trichloro silane or para-chloro methyl phenyl trialkoxy silane, for example the triethyoxy (See Parr & Grohmann, Angew Chem. Int. Ced. 11, 314, 1972).

Suitable cross-linking agents include divinyl compounds such as para-divinylbenzene, meta-divinylbenzene, vinyl cyclohexene, butadiene, diisopropenylbenzene, 1,4-divinyl cyclohexene, glycol dimethylacrylate and divinyl acetylene.

As previously indicated, the starting polymer working examples can be replaced by a polymer having an effective chloromethyl group to provide substantially equivalent results. For instance, polymers prepared from alkyl chloride or copolymers thereof and crosslinked with appropriate cross-linking agents, provide satisfactory starting polymers. If, for instance, the starting polymer does not have a benzene ring such as is present in styrene, the resulting polymer will have an alanine group as a pendant group instead of the phenyl alanine group that is obtained when the benzene ring is present.

What is claimed is:

1. A resinous polymer consisting essentially of recurring units in its molecular formula as follows:

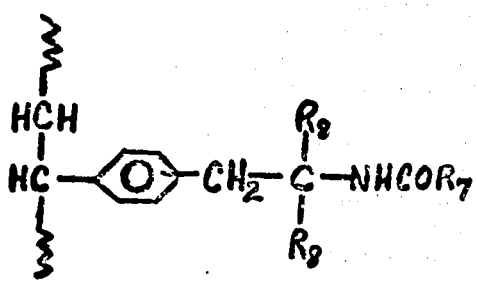

wherein $R_8$ is a COOH group or a precursor, and $R_7$ is an alkyl group of 1 – 5 carbon atoms.

2. The polymer as defined in claim 1 in which $R_7$ is methyl.

3. The polymer as defined in claim 1 in which $R_8$ is a —CN group on one side of the alpha-carbon atom and a —COOC$_2$H$_5$ group on the other side of the alpha-carbon atom.

4. The polymer as defined in claim 1 in which $R_8$ is a —COOH group.

5. The polymer as defined in claim 1 in which the main molecular chain is one of a copolymer of styrene and vinyl acetate.

6. A resinous polymer consisting essentially of recurring units in its molecular formula as follows:

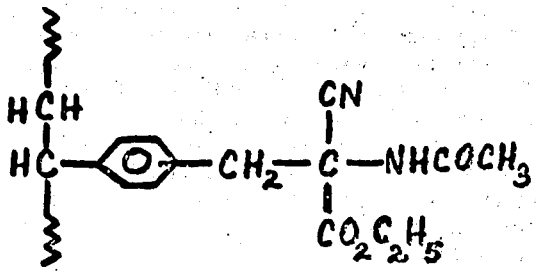

7. The polymer as defined in claim 1, the polymer being a copolymer of styrene and maleic anhydride.

8. The polymer as defined in claim 1, the polymer being a copolymer of styrene and divinylbenzene.

9. The copolymer as defined in claim 8 in which the amount of divinylbenzene is about 2% by weight.

* * * * *